United States Patent [19]
Yamazaki et al.

[11] Patent Number: 5,367,515
[45] Date of Patent: Nov. 22, 1994

[54] OPTICAL RECORDING/REPRODUCING BY REDUCING LASER POWER WHEN THERE IS A TRACK JUMP

[75] Inventors: Koichi Yamazaki, Sakado; Eiichi Nakamura, Sagamihara, both of Japan

[73] Assignee: Nippon Conlux Co., Ltd., Tokyo, Japan

[21] Appl. No.: 874,089

[22] Filed: Apr. 27, 1992

[30] Foreign Application Priority Data

May 1, 1991 [JP] Japan .................. 3-100218

[51] Int. Cl.$^5$ .............................................. G11B 7/00
[52] U.S. Cl. .................................... 369/116; 369/33
[58] Field of Search ................ 369/116, 32, 33, 122; 250/205

[56] References Cited

U.S. PATENT DOCUMENTS

| | | | |
|---|---|---|---|
| 4,660,189 | 4/1987 | Tsukamura et al. | 369/32 |
| 4,871,649 | 10/1989 | Imataki et al. | 430/270 |
| 5,070,496 | 12/1991 | Ogawa et al. | 369/116 |

FOREIGN PATENT DOCUMENTS

| | | |
|---|---|---|
| 407573A1 | 1/1991 | European Pat. Off. . |
| 59-011546 | 1/1984 | Japan . |
| 62-9535 | 1/1987 | Japan . |

Primary Examiner—Paul M. Dzierzynski
Assistant Examiner—James Beyer
Attorney, Agent, or Firm—Spensley Horn Jubas & Lubitz

[57] ABSTRACT

An optical information recording and reproduction apparatus that correctly performs tracking control even when there is a step in the information recording surface in an apparatus that records and reproduces information to and from an information recording medium such as an optical card or the like. An optical information recording and reproduction apparatus which focusses a light spot from a laser onto an optical information recording medium which has a tracking track and performs the recording and reproduction of information to required positions using the tracking track as a reference. The apparatus reduces the optical output of the laser when track jumping and seeking when there is an information reproduction operation.

3 Claims, 8 Drawing Sheets

OPTICAL RECORDING/REPRODUCING BY REDUCING LASER POWER WHEN THERE IS A TRACK JUMP

DETAILED DESCRIPTION OF THE INVENTION

1. Industrial Field in Which the Invention is to be Utilized

The present invention relates to an optical information recording and reproduction apparatus that performs discontinuous scanning of optical cards and the like, has an information recording medium as an object, and more particularly, has an optical output, of a laser source performing optical scanning, capable of being increased and decreased.

2. Background Art

The following is a description of the conventional technology, with reference to FIGS. 2 through 6. Conventionally, when the recording and reproduction of information is performed using an optical information recording medium such as an optical card or the like, and it is necessary to have track jump or seek, tracking error signals are used as the basis for moving the optical head in the direction perpendicular to the tracks while the number of tracks crossed is counted, so that the light spot can be irradiated to a required track position. One method of taking the tracking signals is, for example, the edge mirror method by the inventor of the invention of the present application and disclosed in Japanese Patent Laid Open Application No. 282167-1988.

This method is configured as shown in FIG. 2, and is used for focus error detection and tracking error detection. In this configuration, the dispersed light from the laser is converted into parallel light beams by a collimator lens 2, passes through the diffraction grating 3, the beam splitter 4, the optical path change mirror 5 and the object lens 6 and a light spot is focussed to the surface of the optical information recording medium.

As shown in FIG. 3, this light spot passes from the surface of the optical information recording medium and backwards along the optical path to the beam splitter 4 and reaches the photodetectors 10, 11 after passing through the collimator lens 8 and the edge mirror 9. Then, when the optical system is focussed, the light that is reflected from the optical information recording medium returns as parallel light in the same manner as the irradiated light. On the other hand, when converging light beams are returned, the object lens 6 and the optical information recording medium 7 are farther away when dispersing light beams are returned, they are closer.

These light beams pass through the beam splitter 4 and become converging light at the collimator lens 8 for receiving light. Half of the light has its optical path changed by the edge mirror 9, and the remaining light proceeds in a straight line. The light that proceeds straight ahead is taken as focus error signals by the halving photodetector.

This status is as shown in FIG. 3, and when the object lens 6 and the optical information recording medium 7 are close to each other, D1−D2>0 and when they are apart from each other, D1−D2<0. FIG. 3 also illustrates a focus error signal produced as the optical information recording medium 7 is moved relative to the object lens 6.

Tracking error detection is performed by the three-beam method shown in FIG. 4 (a). The diffraction grating 3 in FIG. 2 makes three beams, and after passing through the beam splitter 4, the mirror 5, and the object lens 6, the three beams are focussed as three spots to the optical information recording medium 7. This irradiated light is reflected by the optical information recording medium, and the zero-degree light that is included in this reflected light is used for focussing error detection, and in the same manner, the ±1 degree light is used for tracking error detection. Thus, the spot which is hemispherical in section and which proceeds from the edge mirror 9 via the collimator lens for light received becomes S2. The spot which is hemispherical in section and which is reflected by the edge mirror 9 becomes S1. The difference between S1 and S2 gives the tracking error signal. FIG. 4 (b) is a track crossing error signal.

The optical information recording medium for which such an apparatus performs focus error detection and tracking error detection is, as shown in FIG. 2, configured as shown in the enlarged view of FIG. 5. The two tracks of a tracking track and a data track are provided to the optical information recording medium, and a photographic printing method is used to provide these tracks onto an acrylic card substrate surface to which an organic substance (a silver chloride) has been applied. The dimensions of the format are a tracking track width of 2.5 μm, an optical reflectivity of 20%, a track pitch of 12 μm, a data track width of 9.5 μm and a reflectivity ratio of 40%.

Problem to be Solved by the Invention

Such a format for an optical information recording medium has the following advantages and disadvantages. The advantage is that it is suited for mass production and can be provided at low cost, while the disadvantage is that steps occur between the tracking track and the data track, and that these steps cause tracking errors.

This disadvantage is described below, with reference to FIG. 6. The tracking track and the data track of the optical information recording medium having the configuration shown in FIG. 6 (a) has a step formed from the protrusion of the tracking track. The height a of this step is about 250 nm, although there is a certain degree of scattering. This value causes a problem due to its relationship with the wavelength of the light generated by the laser.

Lasers for optical information recording medium recording and reproduction usually have a wavelength of 830nm, so one quarter of this wavelength is approximately 208 nm and is therefore a value in the vicinity of the height a of the step. More specifically, the modulation of a compact disc on the basis of the same principle as that of an optical information recording medium is known to use pits having a depth in the vicinity of λ/4.

This is due to the nature of laser light, and a strong laser light having coherency in other words the nature of mutual interference becomes λ/4+λ/4 =λ/2 between the light that is irradiated to the optical information recording medium by the step having a height of λ/4, and the light that is reflected from it, and this produces a status where there is a phase difference of 180°. Accordingly, as shown in (b) of the same FIG. 6, the interference light has a slightly smaller amplitude when compared to the irradiated light and the reflected light. In actuality, the ends of the step portion are not steep, so even though the irradiated light and the reflected light do not completely cancel each other out, there is still a large reduction in the amplitude.

For example, of the three examples shown in FIG. 7, (a), examples ② and ③ show the tracking spot of one side at a track boundary, that is, where there is a reduction from the required light amount and dispersion to outside as a result of one of the two spots S1 and S2 generating interference striking the track boundary. More specifically, in the case shown in ① of FIG. 7 (a), the tracking spots S1 and S2 are both at positions of the boundaries between two tracks (i.e.) at steps and the light amounts of both spots is reduced in the same manner so that there is no influence in the waveform ①' shown in (c) of the same figure.

With respect to this, in the case of ② shown in (a) of the same figure, only the spot S2 is at a boundary of both tracks that and S1' is on the data track surface so the error signal (S1'-S2') via the differential amplifier shown in (b) of the same figure has a shoulder generated in it as shown by the broken line of ②' of (c) of the same figure. Then, the case shown by ③ has the spot S1" positioned at a boundary between both tracks and receives the influence of the step, and the actual light as indicated by the solid line is less with respect to the reflected light of the ideal status indicated by the broken line of (b) of the same figure. Because of this, the difference signal (S1"-S2") has a small amplitude, and the output of the differential amplifier has a negative shoulder as indicated by the broken line in ③'.

These shoulders overlap the ideal waveform shown by the solid line of (c) of the same FIG. when there is track jump and seek in the vicinity of data write start and data write end (i.e.) at both side portions of the card, and the peaks of shoulders ②' and ③' shown by the broken line have single tracking error signals, causing a miscount, so that there is an error in the tracking control.

SUMMARY OF THE INVENTION

In the light of the disadvantages discussed above an object of the present invention is to provide an optical information recording and reproduction apparatus that correctly performs tracking control even if there is a step in the information recording surface in an apparatus that records and reproduces information to and from an information recording medium such as an optical card or the like.

In order to achieve the objective described above, the present invention provides an optical information recording and reproduction apparatus which focuses a light spot from a laser onto an optical information recording medium which has a tracking track and performs the recording and reproduction of information to required positions using said tracking track as a reference, said apparatus being characterized by reducing an optical output of said laser when there is track jump and seek operation, to smaller than when there is an information reproduction operation.

A laser diode operates in the single mode that creates an output of a single wavelength when there is a large output and operates in a multi-mode that creates an output of a plural number of wavelengths when there is a small output. In this multi-mode, the output of a plural number of wavelengths means that there is less interference than the case for when there is the single mode. Therefore, when there is track jump control and seek control is influenced due to interference that is easily received, the output of the laser diode is made smaller and there is operation in the multi-mode.

PREFERRED EMBODIMENT

Figure 1:
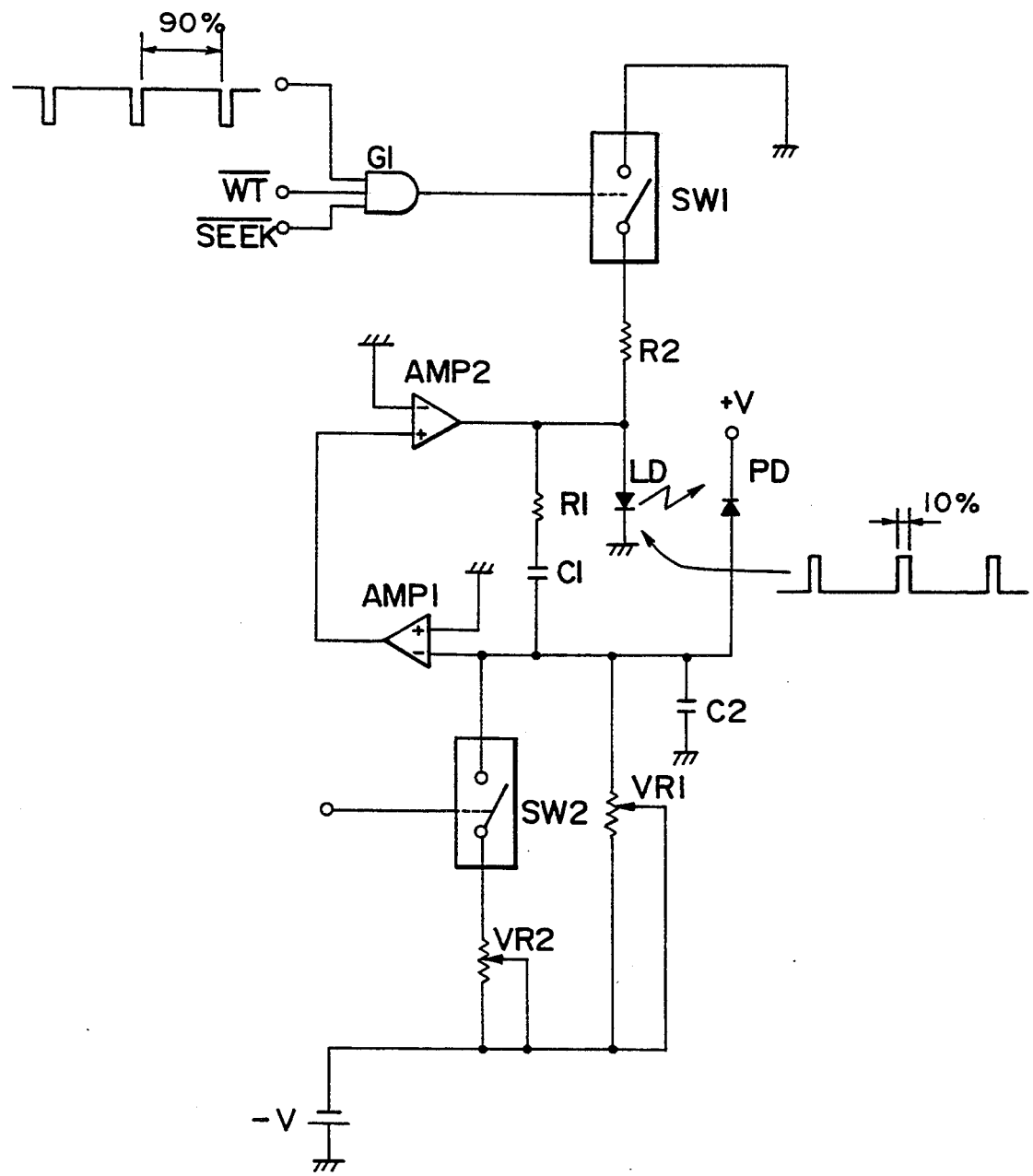
FIG. 1 shows an output switching circuit of a laser diode used in an embodiment of the present invention.
Figure 2:
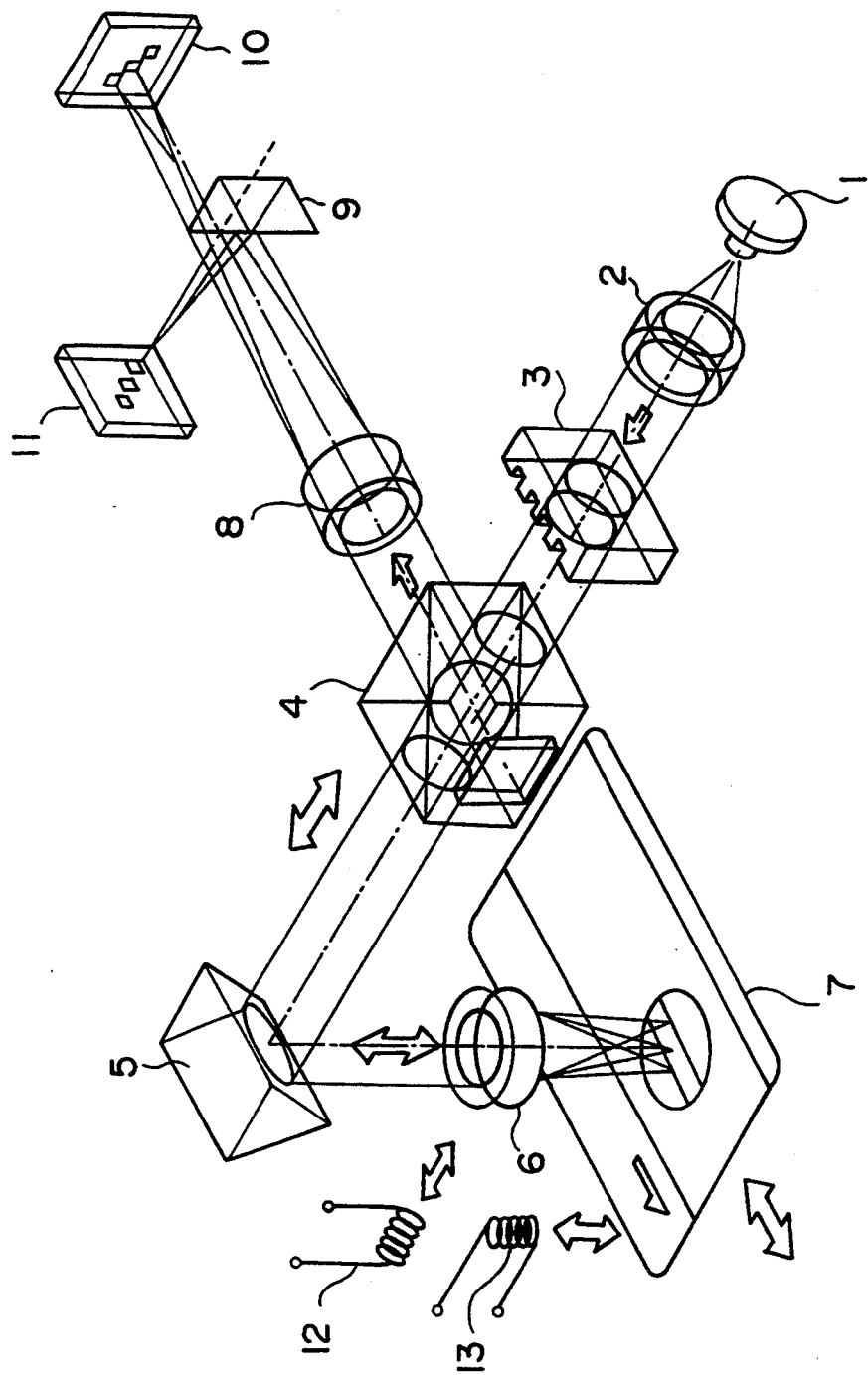
FIG. 2 shows an optical system of the edge mirror type and which is used in the present embodiment.
Figure 3:
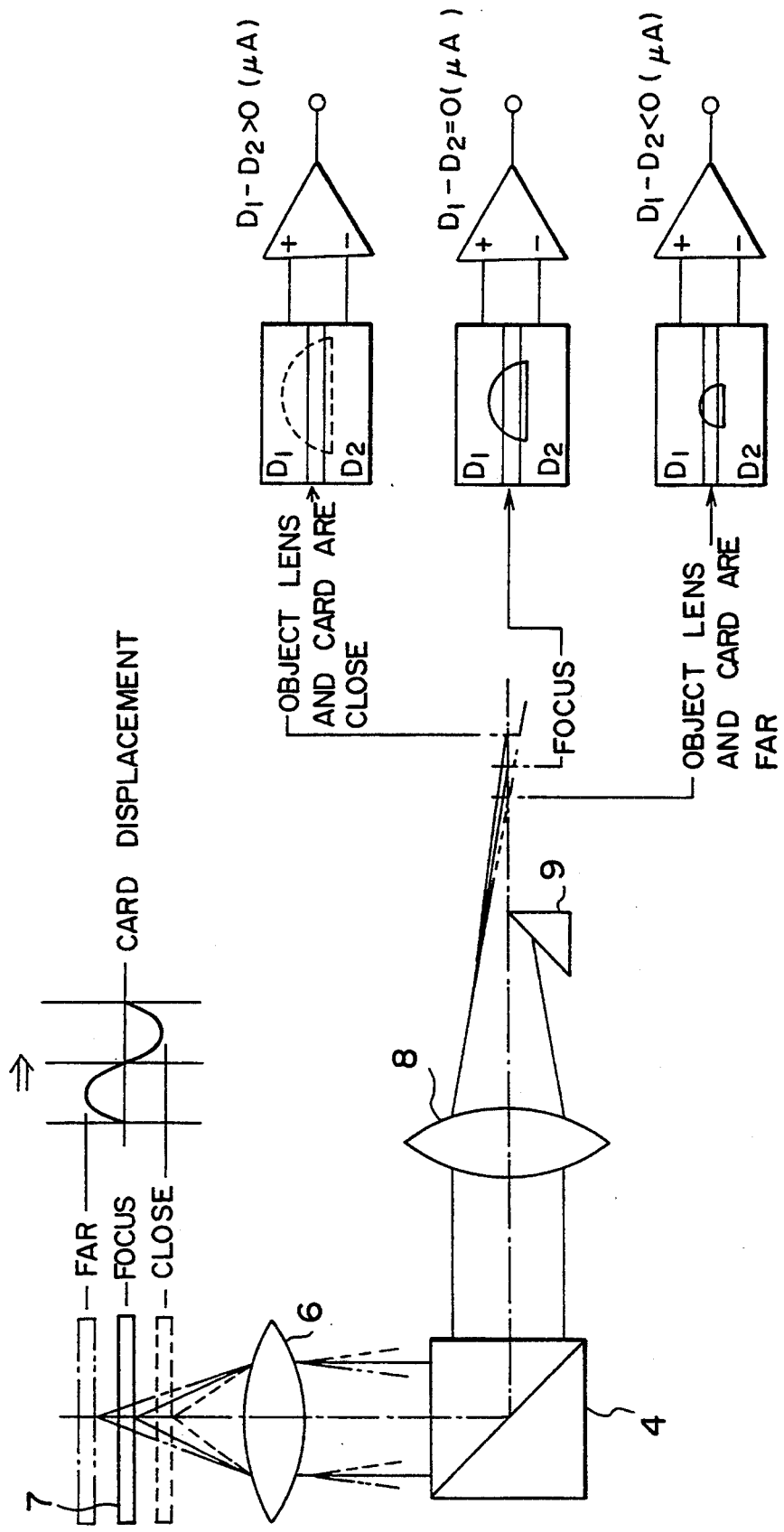
FIG. 3 shows an outline configuration of the edge mirror method, FIGS. 4 (a) and (b) are views describing the tracking error detection method of the edge mirror three-beam method used in FIG. 2 and FIG. 3.
Figure 4:
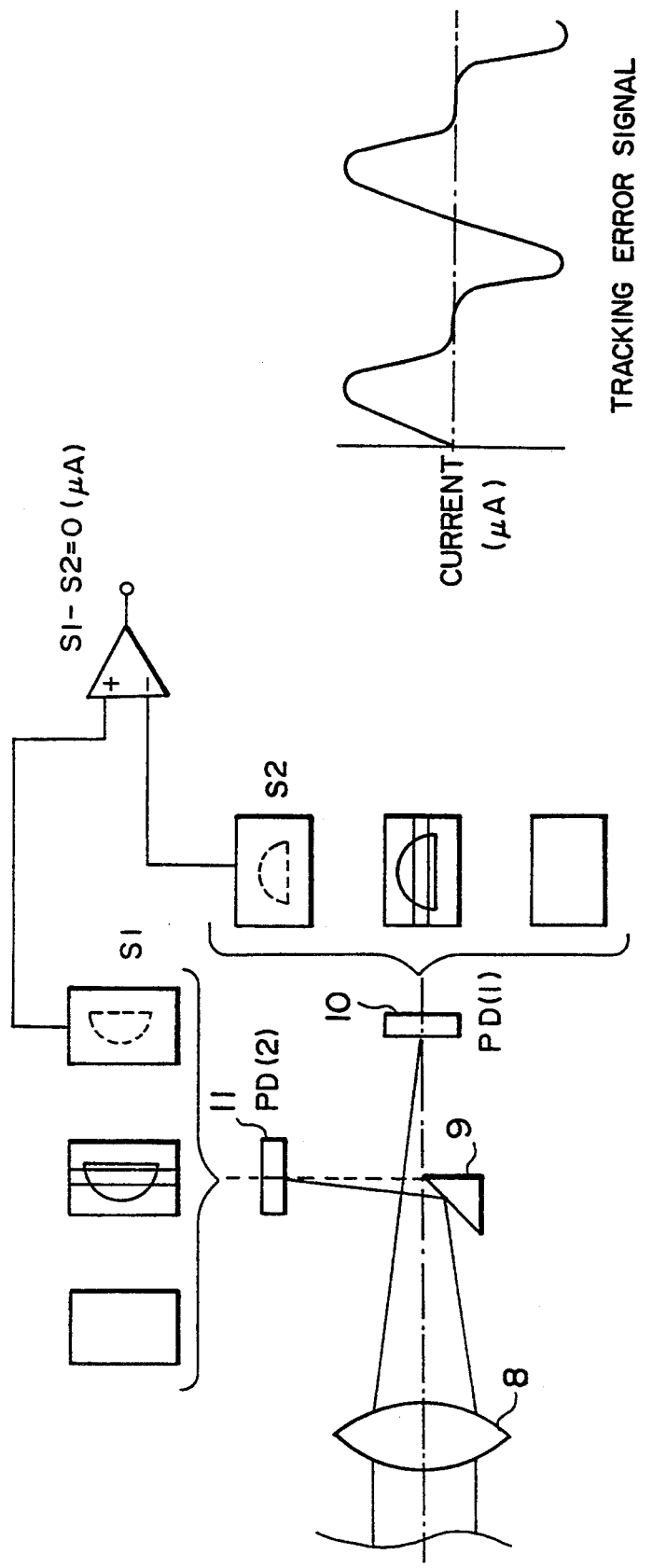
Figure 5:
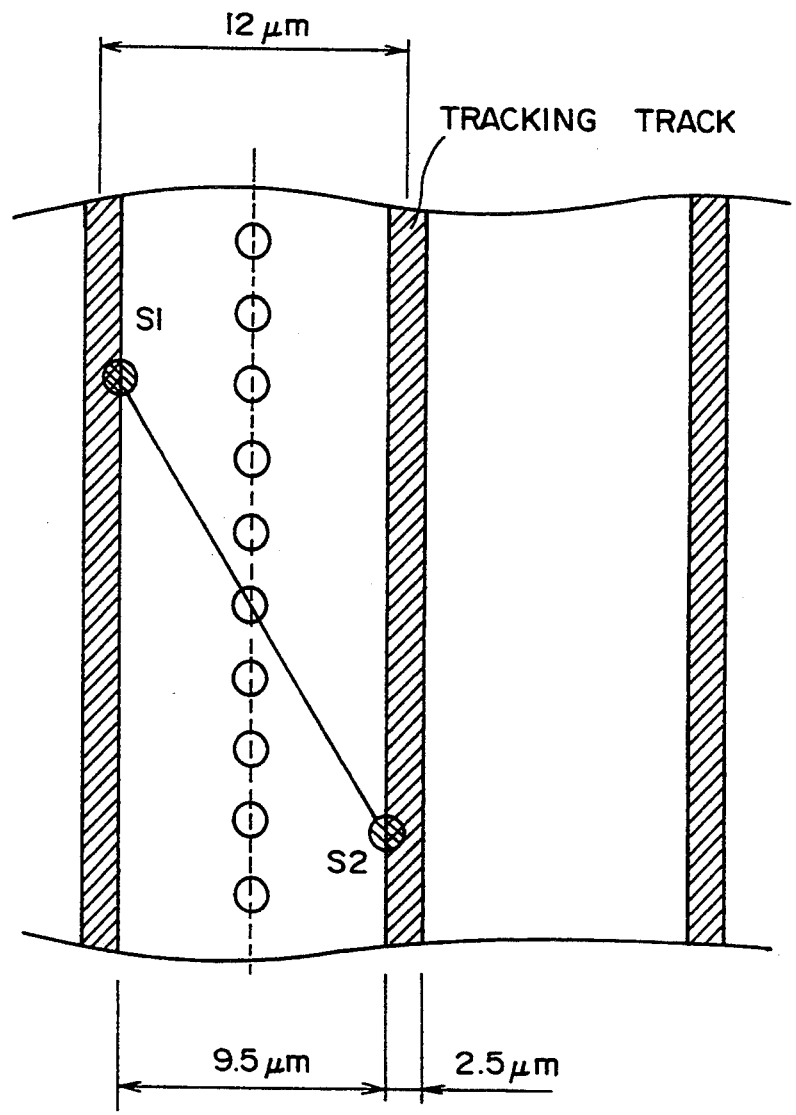
FIG. 5 is a view for describing the tracking error detection method in an optical information recording medium, FIG. 6 (a) and (b) are views describing the interference of laser light in an optical information recording medium.
Figure 6A:
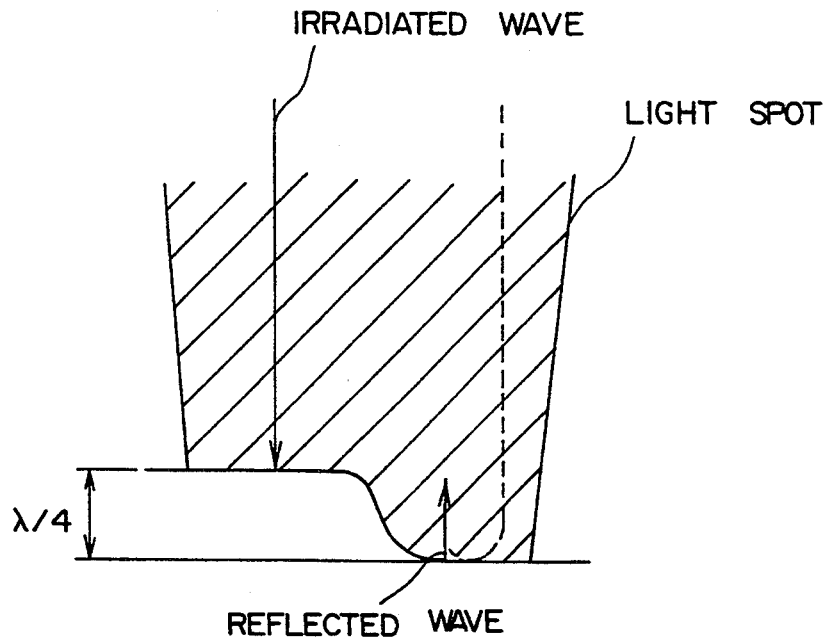
Figure 6B:
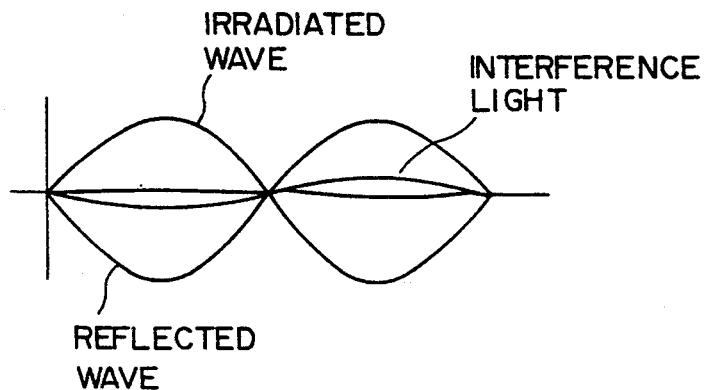
Figure 7:
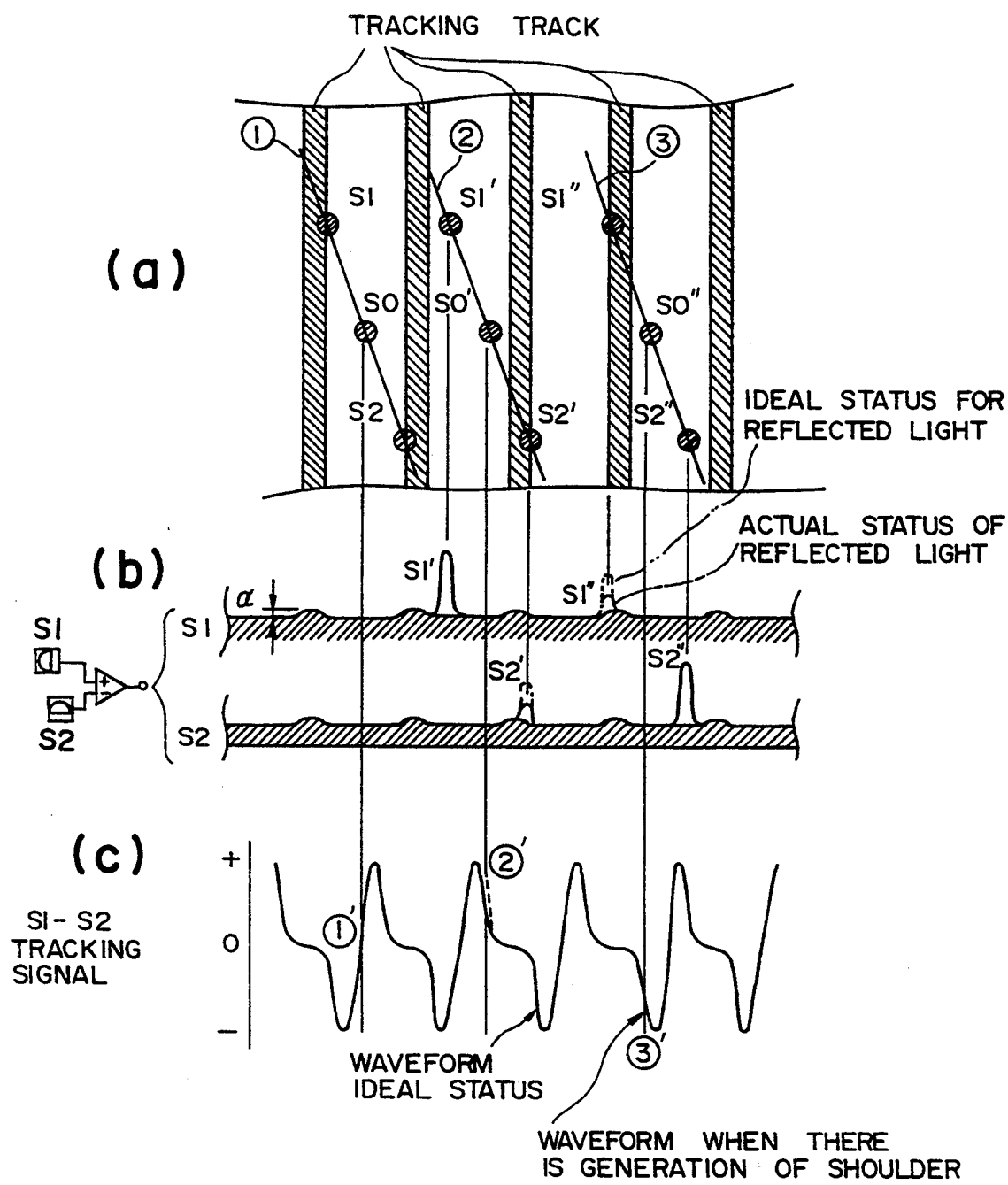
FIG. 7 is a view for describing the problems in tracking error detection in an optical information recording medium.

FIG. 1 shows an output switching circuit of a laser diode used in an embodiment of the present invention. In this circuit, the photodiode PD that receives the light generated by the laser diode LD uses the comparator AMP1 to compare the monitor signals with the reference signals and form the error signals, and these error signals are amplified by the power amplifier AMP2 and the amplified output is supplied to the anode.

The reference signals are obtained by the variable resistors VR1, VR2 that are connected in series with the photodiode PD. The variable resistor VR1 is for applying the reference signals when there is read, and the variable resistor VR2 is for applying the reference signals when writing, and these variable resistors are connected in series with the photodiode PD between the reference voltage +V and −V and form the reference voltage to the comparator AMP1. When reading, the switch SW2 is open since there is no write signal WT, and the set voltage of the variable resistor becomes the reference voltage. When writing, the write signal WT is applied and the switch SW2 is closed so that both of the variable resistors VR1 and VR2 have the combined set voltage and become the reference signal.

The anode of the laser diode LD operates the laser diode LD in a duty cycle so that there is grounding through the resistor R2 and the switch SW1. The switch SW1 opens and closes in accordance with the output of the AND gate G1, and has applied to it the three inputs of a pulse that is high at 90% duty, a WT bar that is high when not writing, and a SEEK bar that is high when seeking or track jumping, and when the AND conditions are established, generates output so that the switch SW1 is turned on.

The series circuit of the resistor R1 and the condenser C2 is inserted between the inverted input terminal of the comparator AMP1 and the power amplifier AMP2. The series circuit has two purposes: first, feed forward action so as to cancel the floating capacitance C2 of the photodiode PD, and second, a smoothing operation for the optical output and switching when reading.

The circuit of FIG. 1 configured in this manner operates in an intermediate mode or a single mode when there is continuous operation of the laser diode LD by the opening of the switch SW1, and the intermittent on-off operation of the switch SW1 causes the laser diode LD to turn on intermittently and to operate in a multi-mode. More specifically, when the switch SW1 is open, there is either recording or reproduction, and when there is recording, the switch SW2 is closed and a large negative voltage from the reference power $-V$ is applied to the inverted input terminal of the comparator AMP1 so that the laser diode LD operates in the single mode. When there is reproduction, the switch SW2 is open and the input to the inverted input terminal of the comparator AMP1 is made smaller so that the laser diode LD operates in the light multi-mode. In addition, when the switch SW1 is intermittently closed, there is seek or track jump and the laser diode LD has 10% operation in the duty cycle so that the average power is extremely small, and the laser diode LD operates in the multi-mode.

Figure 8:
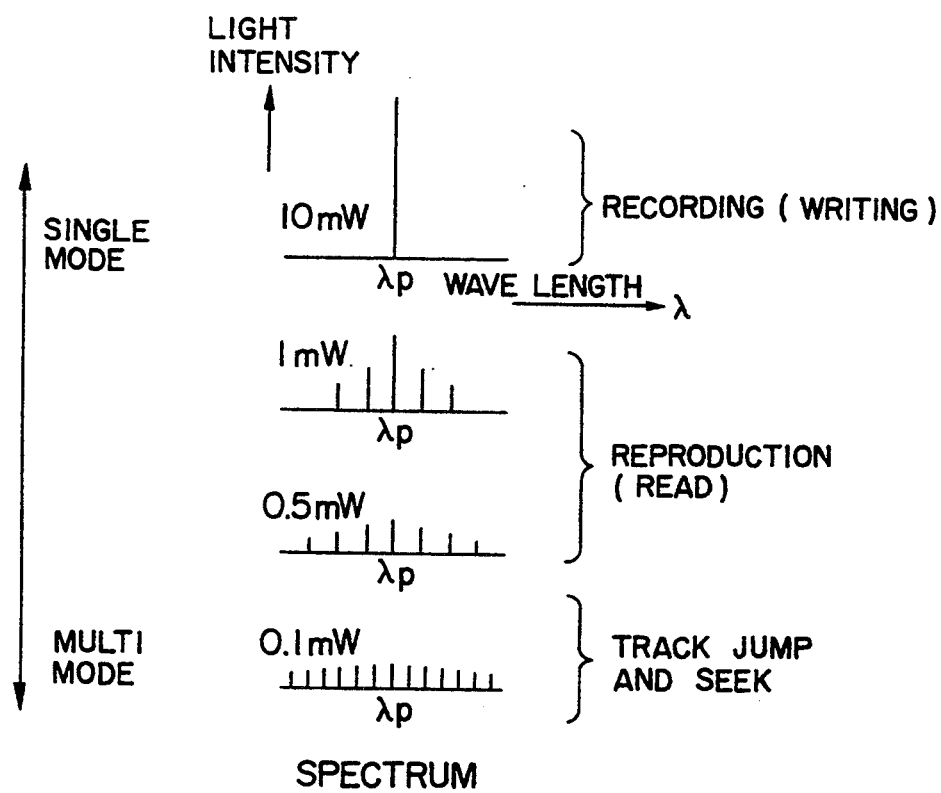
FIG. 8 is a view for describing the operation modes of the laser diode in the present invention.

FIG. 8 shows the light generated by the laser diode (FIG. 1) in each of the operating modes. In the single mode when there is the maximum input, the switch in FIG. 1 is opened and the switch SW2 is closed. This mode is used for recording, and there is output of 10 mW for only light of the wavelength $\lambda p$. The intermediate mode is used as the reproduction mode and the two outputs of 1mW and 0.5 mW are shown but the 1mW output is used in the reproduction mode. The set value of the variable resistor of FIG. 1 can be changes so that 0.5 mW is selected. The intermittent closing of the switch SW1 in FIG. 1 enables the reduction of the power supplied to the laser diode LD in accordance with the duty cycle, and the case shown in FIG. 1 has a duty cycle of 10% so that the output changes from 1mW to one tenth of this which is 0.1mW. The wavelength of this generated light becomes a spectrum which is characteristic of multi-mode and which includes many wavelengths around the central wavelength of $\lambda p$.

In this multi mode, the absolute amount of return light from the optical information recording medium to the laser diode is small when seeking, so that it is possible to prevent unstable operation due to resonance between the laser diode and the medium. As a result, it is possible to prevent fluctuation of the amplitude of the tracking error signals. In addition, the return light is in the multi-mode so as to be close to incoherence so that it is possible to obtain stable tracking error signals that have little interference due to return light.

Figure 9:
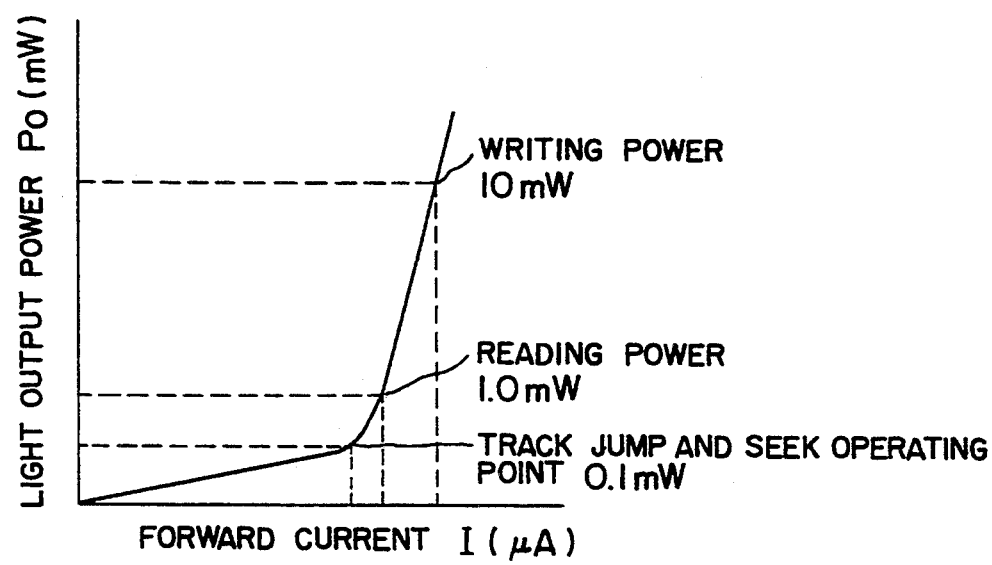
FIG. 9 is a view describing the relationship between the operating characteristics and the operating modes in FIG. 8.

FIG. 9 shows the operating characteristics of the laser diode so that a light output of 10 mW is generated in the single mode which is used when writing, and a light output of 0.1 mW in the multi mode which is used when track jumping and seeking. There is a light output of 1mW generated for the intermediate mode which is used for read.

As has been described above, a laser diode operates in a multi-mode and has a small output when track jumping and seeking, and therefore errors in tracking control when track jumping and seeking, and which are caused by optical interference resulting from steps in the information recording surface of the optical information recording medium when there is large output in the single mode, are prevented and it is possible to have correct control.

What is claimed is:

1. A method of driving a laser provided in an optical information reproduction apparatus to perform reproduction of information, the method comprising the steps of:

outputting a light spot at a first reproduction level from said laser;

focusing said light spot onto an optical information recording medium having a tracking track;

positioning said light spot relative to said tracking track as a reference to perform the reproduction of information; and reducing the output of said laser to a track level by cycling said laser on and off intermittently to cause said laser to operate in a multi-mode when a track jump and seek operation is performed, such that said track level output is smaller than said first reproduction level and said multi-mode operation produces an energy spectrum that includes a plurality of wavelengths each having similar intensity peaks to substantially eliminate the affects of interference.

2. A method according to claim 1, wherein the step of reducing the output of said laser includes reducing the track level output to be less than one tenth of the first reproduction level.

3. A method according to claim 1, wherein the tracking track on the optical information recording medium forms a step transition on said optical information recording medium, and wherein the step of reducing the output of said laser further includes driving the track level output in the multi-mode output such that the wavelengths are centered about a primary wavelength used during the reproduction mode to substantially eliminate phase interference from reflection of said light spot off of said step transition and said optical information recording medium.

* * * * *